3,438,782
EDIBLE OIL SUPPLEMENT FOR FEED RATION
Gilbert D. Elenbogen, Skokie, and Merle A. Clovis, Glenwood, Ill., assignors to Vitamins, Inc., Chicago, Ill., a corporation of Illinois
No Drawing. Filed Jan. 18, 1965, Ser. No. 426,374
Int. Cl. A23k 1/14, 1/18
U.S. Cl. 99—2      2 Claims

ABSTRACT OF THE DISCLOSURE

A vegetable oil based nutritive supplement for animals in the form of an emulsion of 40 to 75% vegetable oil, 10 to 55% emulsifying agent, vitamins, and sufficient water to act as a solvent for any water soluble vitamins present.

---

This invention relates to a nutritive supplement for animals, and to the method for preparing the supplement. In its more specific aspect, this invention relates to such a nutritive supplement for carnivorous fur-bearing animals. In its still more specific aspect, this invention relates to a vegetable oil supplement for the feed ration for animals, and the method for preparing the oil supplement for use in the ration.

It should be understood that this invention is directed in general to a vegetable oil supplement for animals including, for example, fur-bearing animals, dogs, cats and cattle. The invention is described hereinbelow, however, with specific reference to fur-bearing animals such as mink, fox, marten, otter and the like.

A number of fur-bearing animals are raised commercially on ranches or fur farms. The most popular of such fur farms are mink and fox, but there are a number of other fur farms such as marten, fisher, beaver, otter and the like. These animals are extremely sensitive in captivity and require a high degree of care. This is particularly true with respect to their diet which must be properly balanced, palatable and hygenic.

A proper and healthful diet is exceedingly important in maintaining the animals' health thereby minimizing the chances of disease, which could be fatal to a substantial portion of the herd. The invention will be described below in greater detail with respect to mink, but it should be understood that my invention is applicable to other animals as well, including fur-bearing animals.

The ration for mink, as well as for other carnivorous fur-bearing animals, must contain the proper proportions of the basic foods, i.e. proteins, fats, carbohydrates, minerals and vitamins. The proportion for each may vary depending upon such factors as climate, time of year and the particular animal involved. The proper level of fresh, digestable vegetable oil is of great importance to the mink in obtaining a healthy, prolific and valuable mink. Vegetable oils in the diet are highly concentrated sources of energy and contain variable amounts of vitamins and unsaturated fatty acids. In addition, vegetable oils act as the vehicle for the fat-soluble vitamins, and as the medium from which these vitamins are absorbed by the animal body.

For this reason, it is standard practice with the mink farmer or rancher to supplement the mink ration with vegetable oils. The vegetable oils generally used for supplementing the ration are polyunsaturated oils such as wheat germ oil, corn oil and the like.

Incorporating vegetable oils with the ration presents a number of problems. For example, the oils per se are generally unpalatable. When these oils are added to the feed ration, the oil has the tendency to settle on top, thereby resulting in a feed of non-uniform composition and further adversely affecting the palatability of the feed. In commercial operations, these oils stick to the mixer and to the feeding troughs thereby inducing spoilage which is detrimental to the palatability of the feed and further causing serious cleaning problems which might readily introduce a source of contamination leading to the chance of serious diseases among the mink. Because mink are finical eaters, these factors can be detrimental to their appetites thereby causing the mink to go "off feed" which impairs their growth and fur-bearing value and even causes death.

The purpose of this invention, therefore, is to provide a vegetable oil supplemnet for the mink ration having none of the foregoing disadvantages and which is readily dispersible in the ration.

In accordance with the present invention, I provide a vegetable oil supplement for the mink ration comprising vegetable oil, an emulsifier for the oil and water. The vegetable oil supplement is formed as a homogeneous emulsion which can be readily admixed or dispersed with the mink ration. The vegetable oils employed in the supplement may be any of the edible vegetable oils and may include saturated and unsaturated oils. Examples of suitable oils are wheat germ oil, soybean oil, corn oil, safflower oil and the like. The polyunsaturated vegetable oils are particularly desirable. In addition, the feed supplement is further enriched by the addition of a wide variety of oil soluble vitamins and water soluble vitamins. It has been found especially desirable that all the vitamins be incorporated with the supplement. The oil soluble vitamins include, for example, vitamins A, $D_2$ and E and the water soluble vitamins include, for example, vitamins $B_1$, $B_2$ and C. The vitamins are dissolved in the appropriate phase of the supplement, and therefore these micronutrient essential products are uniformly dispersed and are in a form more readily absorbed biologically.

The quantity of vegetable oil employed in the supplement will vary depending primarily upon the degree to which the feed ration needs to be supplemented by oil. For purposes of this invention, oil content for the supplement would normally run not more than about 75%, by weight, and usually in the range of 40 to 75%, but more or less might be employed depending upon the particular need for the animal. Usually preparing a supplement much below 40% is of little or no economic value in that the quantity of oils added to the ration is too low in proportion to the total supplement. On the other hand, there is generally no need to employ more than 75% oils in the supplement. In addition, I have found that an emulsion is not too readily formed with quantities much higher than 75%. It is preferred to employ an oil content of from about 60 to 70%, by weight, in the supplement.

As mentioned above, the oil supplement is prepared as an emulsion which is incorporated into the ration. For this purpose, the fat is emulsified with a suitable emulsifying chemical agent. Suitable emulsifying chemical agents include, for example, the sorbitan esters of fatty acids such as sorbitan monolaurate, sorbitan monopalmitate, sorbitan monostearate and sorbitan monooleate, polyoxyethylene sorbitan esters of fatty acids and mixed fatty acids such as polyoxyethylene sorbitan monolaurate, polyoxyethylene sorbitan monostearate, polyoxyethylene sorbitan monooleate, polyoxyethylene sorbitan oleate-stearate. Also, the monoglycerides and polyglycerides, soap stearates and higher fatty alcohol emulsifying agents can be used. A mixture of polyoxyethylene sorbitan monooleate and polyglycerol oleate is especially desirable for this keeps the emulsion clear which is desirable for feeding purposes.

The proper quantity of chemical emulsifying agent employed in preparing the fat supplement is dependent primarily upon the quantity of oil used and the type of oil, and may be readily determined by experiment. However, it is economical to employ a minimum amount of emulsifying agent, but there must be sufficient quantity present to sufficiently emulsify the oil and form a uniform material. I have found that about 10 to 55%, by weight, emulsifying chemical agent is suitable for the amount of oil employed in the supplement and preferably about 30 to 50%. Quantities greater than 55% generally are not necessary nor desirable in that no additional benefit is received from a larger quantity and the larger quantity is not economical.

A small quantity of water is employed in the oil supplement in order to render it possible to incorporate water-soluble vitamins into the supplement. The quantity of water employed can vary depending upon such factors as the amount of type of vitamins added, as well as the type and amount of emulsifying agent used. Also, a larger quantity of water will render the product more economical. I have found that generally from about 0.5 to 10% water, by weight, is satisfactory, and in the preferred embodiment, about 1.5 to 6% water.

In preparing the fat supplement, the water-soluble vitamins are admixed with the water. The oil-soluble vitamins are admixed with the oil, and the emulsifying agent is then added to the mixture. The material is thoroughly admixed by any suitable mechanical mixer or blender such as a Waring Blendor or other impeller type blenders.

The oil supplement formed in accordance with this invention is a water in oil emulsion, and the oil is the external phase. The rancher further dilutes the oil supplement with water just prior to incorporating it it into the feed ration, and the emulsion inverts to an oil in water emulsion. The quantity of oil supplement then incorporated into the feed ration depends upon the particular nutritional requirements for the animal.

The invention is illustrated by one specific example which has been found to be particularly desirable with a typical mink ration. The oil supplement weighing about 40 pounds comprises:

| | Pounds |
|---|---|
| Wheat germ oil | 20 |
| Polyoxyethylene (20) sorbitan monooleate | 10 |
| Polyglycerol oleate | 8 |
| Water | 2 |

The following were dissolved in two pounds of water:

| | Grams |
|---|---|
| d Calcium pantothenate | 36 |
| Niacinamide | 10 |
| Thiamine hydrochloride | 4 |
| Pyridoxine hydrochloride | 4.8 |
| Vitamin K sodium bisulfite salt | 3.25 |
| Riboflavin | 2 |
| Choline chloride | 140 |

The following were dissolved in the 20 pounds of wheat germ oil:

2.6 grams vitamin A palmitate at 1.5 million units per gram 2 grams vitamin $D_3$ at 1 million units per gram In addition, the wheat germ oil contained 2 units of vitamin E per gram. This supplement was prepared in accordance with the method described above, and the water-soluble vitamins and oil-soluble vitamins were incorporated as described above. The oil supplement of this invention is particularly useful in typical rations containing meat, fish, poultry, digested eggs and other proteinous materials in combination with the other constitutents of the ration such as tripe, cereal, bone, etc.

The oil supplement having the above designated combination of constitutents, and prepared in the manner described, can be added readily to all types of feed mixtures or rations and can be dispersed uniformly throughout the ration. As a further significant advantage, since the oil supplement is an emulsion, it is more readily assimilated or absorbed by the body than ordinary fats and oils. In addition, the oil supplement incorporated into the ration does not stick to the feeding trough thereby eliminating any special cleaning problems.

Having described our invention, and certain embodiments thereof, we claim:

1. A vegetable oil supplement for feed ration for animals comprising a homogeneous emulsion of an edible vegetable oil, an emulsifying agent, water and vitamins selected from the group consisting of oil-soluble vitamins and water-soluble vitamins, wherein said supplement contains from about 60 to about 70% by weight of vegetable oil, from about 10 to about 55% by weight of emulsifying agent, and from about 1.5 to about 6% by weight of water.

2. A method for preparing a vegetable oil supplement for feed rations for animals comprising adding oil-soluble vitamins to an edible vegetable oil, emulsifying said oil with a suitable emulsifying agent, adding water-soluble vitamins to water, admixing said water with the resulting oil emulsion, and blending the resulting mixture to form a homogeneous mixture, wherein said vegetable oil supplement contains 60 to 70% by weight vegetable oil, 30 to 50% by weight emulsifying agent and 1.5 to 6% by weight water.

References Cited

UNITED STATES PATENTS

| 2,953,496 | 9/1960 | Phillips | 167—66 |
|---|---|---|---|
| 3,117,866 | 1/1964 | Golub | 99—2 |

FOREIGN PATENTS 828,312  2/1960  Great Britain.

RAYMOND N. JONES, *Primary Examiner.*

J. M. HUNTER, *Assistant Examiner.*